Nov. 4, 1924.

V. A. BACEVICZ

AMPLIFIER 1,514,123

Filed April 26, 1922

Vytold A. Bacevicz, Inventor

By Richard B. Owen, his Attorney

Witnesses

Patented Nov. 4, 1924.

1,514,123

UNITED STATES PATENT OFFICE.

VYTOLD A. BACEVICZ, OF SYRACUSE, NEW YORK.

AMPLIFIER.

Application filed April 26, 1922. Serial No. 556,785.

*To all whom it may concern:*

Be it known that I, VYTOLD A. BACEVICZ, a citizen of the United States, residing at Syracuse, in the county of Onondaga and State of New York, have invented certain new and useful Improvements in Amplifiers, of which the following is a specification.

This invention relates to an impulse or movement amplifier and has special reference to a method and means for the amplification of resistance variations in an electrical circuit by means of a shifting light beam.

It is a well known fact that certain substances, such as selenium and the like vary in electrical conductivity in accordance with the intensity of light falling on them so that when such substances are screened from the light their conductivity is practically zero. If two parallel resistance elements are bridged throughout their length by such a substance and are connected in an electric circuit in such manner that the current, in order to flow will have to pass from one to the other across the bridge in a U shaped path the effective length of these elements may be regulated by keeping the major part of the bridge darkened and throwing a bar of light across such bridge at the point where it is desired to establish conductivity. In other words, the light bar will constitute a frictionless and imponderable slider for a parallel resistance rheostat.

The principal object of this invention is to provide an improved method and means for utilizing a light bar as a resistance controlling element.

The application of a beam of light as an imponderable lever arm for the amplification of movement is well known in physics.

A second important object of the invention is to provide an improved amplifying device suitable for the detection and measurement of delicate or minute movements such as electrical impulses, sound waves and in fact vibrational impulses, oscillations and other movements of all sorts which require for the measurement and detection amplification and which on account of their character are difficult of such amplification by ordinary mechanical means.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1:
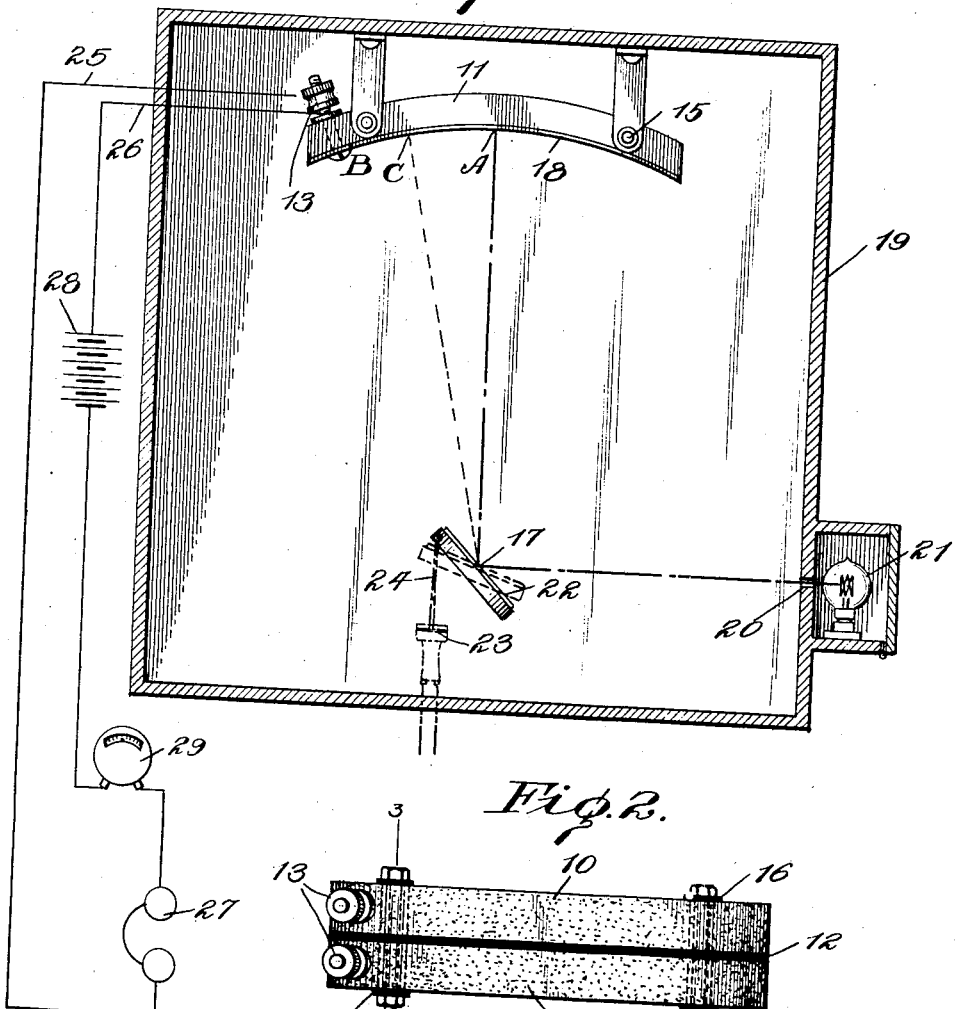
Figure 1 is a general view of the entire apparatus, the view being in side elevation and partly diagrammatic.
Figure 2:
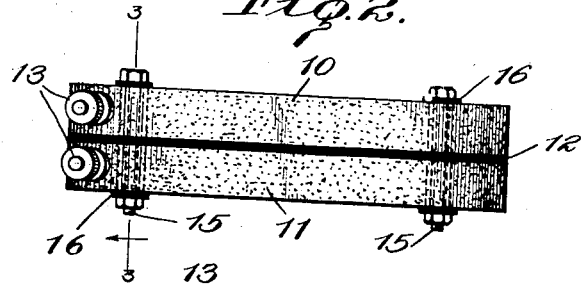
Figure 2 is a plan view of the resistance cell or element.
Figure 3:
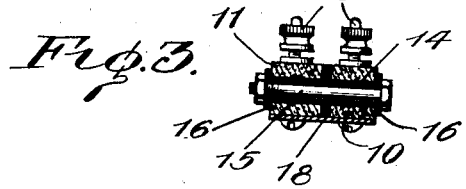
Figure 3 is a section on the line 3—3 of Figure 2.

This principal part of this invention may be termed a photo-rheostat and consists of a pair of bars 10 and 11 at least one of which constitutes a high resistance element. These bars arranged side by side in parallelism and are separated from each other by a thin strip 12 of a suitable insulation such as mica or the like. At one end the pair of bars are provided with binding posts 13 and at each end a sleeve 14 of insulating material passes through the bars so that a bolt 15 may extend through this sleeve, the head and nut of said bolt resting on insulating washers 16. By this means the two bars are held in accurately spaced relation throughout their length.

The bars and insulating strip are curved concentric with a point 17 and the convex side of this structure is entirely covered over by a thin layer 18 of a suitable substance possessing the power of becoming a conductor of electricity when exposed to light. For this purpose the coating may consist of selenium, one of the thallium compounds such as thalofide or one of the known sulphides having such property. The coating may be applied by fusion so that it entirely covers this surface and bridges over the insulation between the conductor bars.

With a structure such as this, which is preferably termed the photo-rheostatic cell, supported in the dark and so arranged that a beam of light in the form of a narrow bar may sweep over it from the point 17 it will be obvious that the effective length of the high resistance bars may be varied by shifting the position of the light spot on the concave surface which is photo-conductive.

This cell is preferably supported in a dark casing 19 having a narrow slit 20 in one side so that a narrow bar or beam of light may enter the casing from a suitable source of illumination such as the lamp 21. For the purpose of illustration a mirror 22 is shown as pivoted at the center 17 so that the light beam entering the slot 20 strikes the mirror at its axis with such a construction which is to be understood as merely typical, it is obvious that any movement about the mirror at its axis will cause movement of the light spot on the photo-conductive surface. For instance if the mirror is in the position shown diagrammatically in full lines the light spot will strike the cell at A in this case the effective length, as resistance elements, of the bars 10 and 11 will be the measurement along the arc A—B. Again, if the mirror is moved to the position shown in the dotted lines the light spot will strike the cell at C and the effective length of said bars will be B—C. As typical of one means for moving the mirror it may be assumed that a vibratory diaphragm 23 forms part of the receiver of a telephone and is connected to the mirror by a link 24. Under these circumstances it will be obvious that vibration of such diaphragm under the influence of electric impulses or waves, such as are utilized in the telephone for producing this vibration, will produce similar oscillation of the mirror and consequently the light spot will flicker back and forth on the cell. If now the binding posts have wires 25 and 26 connected to them and these wires are connected in series through such an instrument as a telephone receiver 27 and a battery 28 then the shifting of the light spot on the photo-conductive surface will cause consequent variations in the resistance in the circuit through the telephone receivers 27 and depending on the radius of the cell the movement of the mirror may be amplified to any required degree, it being understood that the intensity of the light spot is maintained irrespective of the radius of curvature of the cell. In this manner the local circuit oscillations may be indefinitely increased over the oscillations in the circuit actuating the diaphragm 23.

If desired a measuring instrument such as a milliameter 29 may be used in the local circuit.

Now it is to be understood that while the cell has been here shown as connected for telephonic amplifications it is by no means intended to restrict the application of the device to such use alone, since it is obvious that the mirror 22 may be actuated by many different means and also that either the receiver 27 or milliameter 29 or both of these may be replaced in the local circuit by any suitable measuring or (detecting) energy transforming instrument or apparatus and that such local circuit may even be used as a means for actuating the mirror of a second apparatus of this character so as to produce a multi-stage or cascade amplification.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described but it is wished to include all such as properly come within the scope claimed.

For undistorted amplification of an impulse the light sensitive substance covering the resistance bars must be of uniform thickness as well as resistance throughout. For this latter the resistance bars must be perfectly parallel. The resistance bars must be of uniform resistance throughout.

A photo electric cell may be used in the same capacity as the cell using the light reactive substance, only it would require alterations in design to suit it to this kind of work. In this case a rubidium screen or some other similar material would be used in place of the selenium or light reactive substance covering the resistance rods.

Instead of increasing the actual distance between cell and point of reflection to obtain increased motion of the bar of light which crosses the resistance bars perpendicularly, a suitable system of unions may be used, this would also necessitate a suitable alteration in the shape of the cell, i. e., the curvature in relation to the point of reflection.

Having thus described the invention, what is claimed as new, is:—

1. A resistance element including a pair of spaced arcuate bars having equal radii and arranged side by side with their centers of curvature at common axis, said bars being electrically separated and at least one bar being of high resistance material and a bridge of photo-conductive material extending from end to end of and bridging the space between said bars.

2. A resistance element including a pair of spaced arcuate bars having equal radii and arranged side by side with their centers of curvature at common axis, said bars being electrically separated and at least one bar being of high resistance material, a bridge of photo-conductive material extending from end to end of and bridging the space between said bars, and means at one end of the element for connection of a pair of circuit wires, each to a respective bar.

3. A resistance element including a pair of spaced arcuate bars having equal radii and arranged side by side with their centers of curvature at common axis, said bars being electrically separated and at least one bar being of high resistance material, a bridge of photo-conductive material extending from end to end of and bridging the space between the said bars, and means at the center of curvature of said bars for projecting an oscillatable light beam on the photo-conductive bridge.

4. A resistance element including a pair of spaced arcuate bars having equal radii and arranged side by side with their centers of curvature at common axis, said bars being electrically separated and at least one bar being of high resistance material, a bridge of photo-conductive material extending from end to end of and bridging the space between the said bars, means at the center of curvature of said bars for projecting an oscillatable light beam on the photo-conductive bridge, and means at one end of the element for connection of a pair of circuit wires, each to a respective bar.

5. A resistance element including a pair of spaced arcuate bars having equal radii and arranged side by side with their centers of curvature at common axis, said bars being electrically separated and at least one bar being of high resistance material, a bridge of photo-conductive material extending from end to end of and bridging the space between the said bars, means at the center of curvature of said bars for projecting an oscillatable light beam on the photo-conductive bridge, means at one end of the element for connection of a pair of circuit wires, each to a respective bar, circuit wires connected to the last mentioned means and connected also to a battery and a suitable indicating instrument.

In testimony whereof I affix my signature in presence of two witnesses.

VYTOLD A. BACEVICZ.

Witnesses:
HARRY G. ELLIOTT,
WILLARD D. SNYDER.